Nov. 29, 1960   W. D. CASHMAN ET AL   2,961,893
POWER TRANSMISSION DEVICE
Filed June 16, 1958
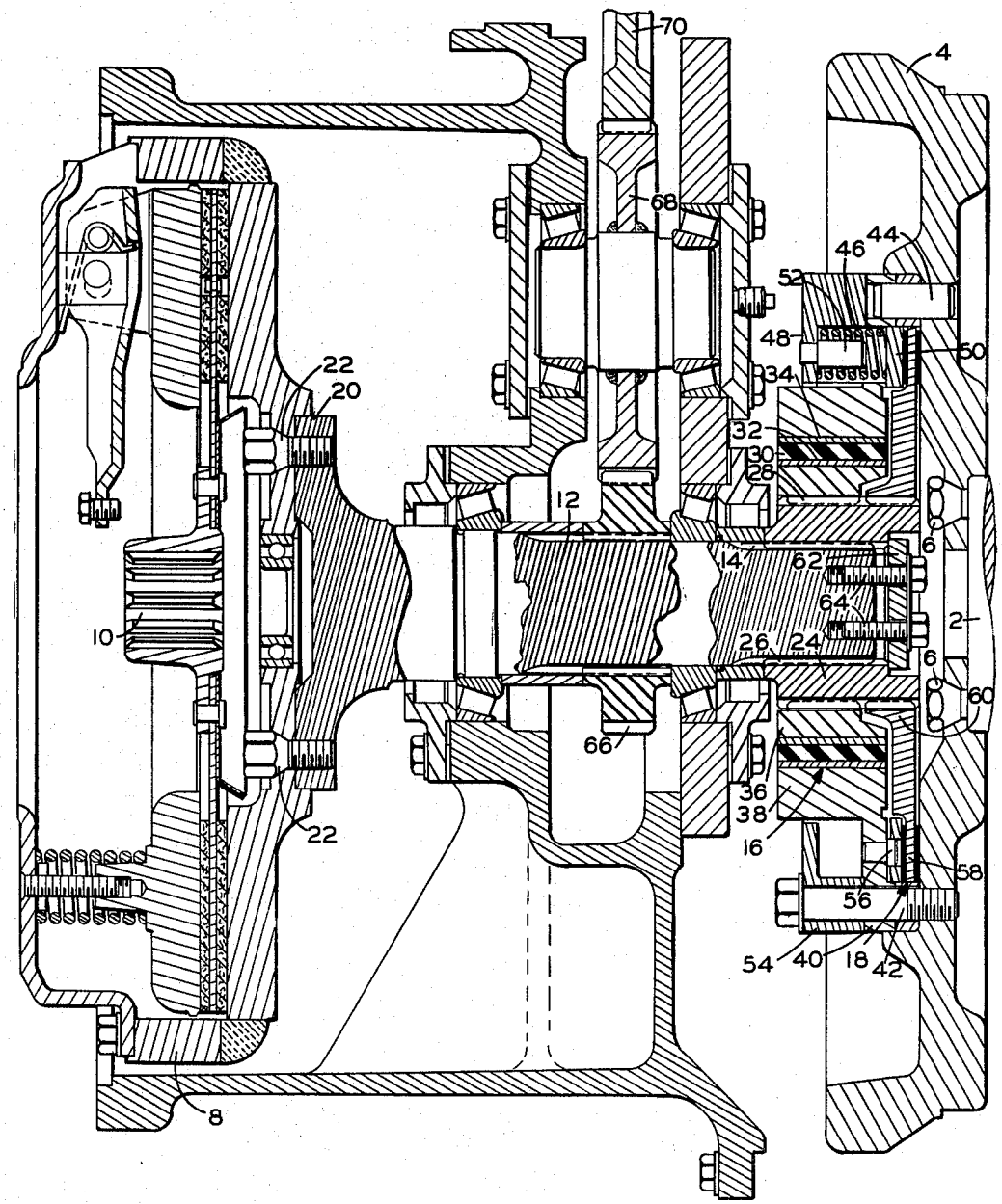
INVENTORS:
WALTER D. CASHMAN
ERNST W. SPANNHAKE
BY
John F. Schmidt

United States Patent Office 2,961,893
Patented Nov. 29, 1960

2,961,893

POWER TRANSMISSION DEVICE

Walter D. Cashman and Ernst W. Spannhake, Peoria, Ill., assignors to LeTourneau-Westinghouse Company, Peoria, Ill., a corporation of Illinois Filed June 16, 1958, Ser. No. 742,133

4 Claims. (Cl. 74—574)

This invention relates to a device to transmit power, especially to a device to transmit power from a reciprocating-piston type engine having a power take-off, and for some applications is an improvement on the invention disclosed and claimed in the copending application of Ernst W. Spannhake, Ser. No. 742,132, filed June 16, 1958, and assigned to the assignee of this invention.

The sole figure of the drawings shows a preferred embodiment of the invention and is a longitudinal sectional view through a power transmission device made according to this invention.

The drawing shows an engine shaft 2 which may be the crankshaft of any conventional piston-type engine. To the shaft 2, there is secured a flywheel 4 by any suitable means, as for example by threaded members, one of which is shown at 6. The flywheel and its attached operating parts, if any, constitute a flywheel assembly which is one mass of a two-mass system. The other mass of this system consists of a clutch assembly indicated generally at 8 and having an output member 10. A drive coupling connects the two masses and includes a shaft 12 having a driving connection at its one end with one mass of the system (here shown as the clutch assembly) and splines 14 at its other end, flexible torque transmitting means indicated generally at 16 connected with the shaft splines and with the other mass (in this embodiment, the flywheel assembly), and friction means indicated generally at 18 connected with the shaft splines and having a friction connection with said other mass (the flywheel assembly).

More specifically, the clutch assembly 8 may be any one of a number of conventional clutches the details of which need not be set forth here. Shaft 12 is shown as provided with a flange 20 to which the input clutch member is secured by threaded members 22. At its other end, shaft 12 is provided with splines 14 as aforesaid. For ease of assembly, the connection of the flexible torque transmitting means 16 and the friction means 18 with the splines 14 is not a direct one. Instead, a member 24 is provided with internal splines 26 which engage the shaft splines 14; member 24 is then additionally provided with external splines 28 to which the flexible torque transmitting means 16 and the friction means 18 are connected by means of cooperating internal sp'ines.

In the embodiment shown, the flexible torque transmitting means 16 takes the form of a resilient bushing 30 of rubber or the like. Resilient bushing 30 may be securely bonded to metal sleeves 32 and 34. The resilient bushing and its method of manufacture are not the subject of this application. Bushings of this type are commercially available, for example, from Clevite Harris Products, Inc., Cleveland, Ohio.

Metal sleeve 32 is secured on a ring 36 in such a manner as to prevent relative rotation. In actual practice, sleeve 32 is pressed onto ring 36 in what is known an an interference fit. In like manner, sleeve 34 is pressed into a ring 38.

Ring 36 is internally splined to cooperate with the external splines 28 referred to above. Ring 38 is provided with a flange 40 which is here shown as formed integral with ring 38. However, this member may be fabricated of two separate pieces secured together in any suitable manner, as for example by welding. Ring 38 and integral flange 40 are held against rotation relative to flywheel 4 by means of threaded members 42 and dowel pins 44.

The friction means 18 is resiliently loaded. In the embodiment shown, at suitable intervals, flange 40 is provided with openings to receive a number of circumferentially spaced springs, one of which is shown at 46. Springs 46 are conventional helical springs and are adapted to be in compression between reaction member 48 and a pressure plate 50, and are guided by guide pins 52 secured in suitable openings in the reaction member 48.

In the embodiment here shown, the reaction member 48 consists of a flange on a ring 54; ring 54 is provided with openings at suitable intervals to receive the aforesaid threaded members 42 which therefore hold the ring 54 and its flange 48 against rotation relative to flywheel 4.

Pressure plate 50 is provided with openings at suitable internals to receive pins 56 which also engage the flange 40. Thus pressure plate 50 is held against rotation relative to the flywheel.

The description above refers to friction means 18. Friction means 18 comprises a friction member 58 such as is often used for a clutch disc, and the cooperating faces of pressure plate 50 and a friction face on the flywheel. At its center, friction member 58 is provided with a hub 60 which is splined internally to cooperate with the external splines 28 referred to above.

It may be noted here that the internally and externally splined member 24 may be secured in place in any suitable manner, as for example by a plate 62 and threaded members 64, members 64 engaging the end of shaft 12.

Power is taken off the shaft 12 by means of a gear 66 suitably mounted on and secured to the shaft. In the embodiment shown, gear 66 meshes with another gear 68 which in turn meshes with still another gear 70. Gear 70 drives the power take-off shaft through any suitable connection. The various shafts and gears are suitably mounted for rotation in conventional bearings which need not be described in detail inasmuch as such matters are well understood by those skilled in the art.

Operation

As the engine shaft 2 rotates, it drives the two-mass system which includes the flywheel assembly and the clutch assembly. The power impulses of the several cylinders cause the flywheel 4 to turn with a variable angular velocity. If shaft 12 were rigidly connected to the two masses, the torsional vibrations caused by the variations in angular velocity would eventually result in failure of the shaft. It is conceivable that the shaft 12 could be made so large as to avoid such failure, but a shaft large enough to meet the requirements from the standpoint of satisfactory service would be so large as to be impractical. Accordingly, the means 16 are provided, these means comprising flexible torque transmitting means which permit variations in angular velocity of the flywheel 4 but without transmitting those variations to the shaft 12 to any considerable extent.

It has been found that, under certain load and speed conditions, as well as such considerations as number of engine cylinders, whether the engine is a two-stroke cycle engine or a four-stroke cycle engine, and the like, that the amplitude of the torsional vibrations caused by the varying angular velocity of flywheel 4 is so large as to result in early failure of the resilient bushing 30. To extend the life of bushing 30 sufficiently to make such a drive feasible, it has been found desirable to add means to dampen the torsional vibrations or variations in angular velocity. The friction means 18 has the effect of dampening the variations. In actual practice, a successful combination has been built in which the springs 46 which constitute the resilient means to load the friction dampener are compressed sufficiently in the final assembly to make the friction means capable of transmitting torque having an order of magnitude equal to net engine torque, although it will be understood by those skilled in the art that considerable variation in the transmitted torque can be tolerated.

It will be apparent from the foregoing that there is here provided a power transmission device which is capable of transmitting engine torque through a two-mass system with a minimum of transmission of torsional vibrations and a consequent maximum life of the power transmission device. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A power transmission device to connect a two mass system, one mass of which is a driving mass having a flywheel and the other mass of which is a driven mass, said device comprising a shaft having one end connected to the driven mass; a pair of concentric annular members, said members being positioned in a plane normal to the axis of the shaft, the inner member being connected to the shaft, the other of the members being connected to the driving mass; a resilient bushing positioned in said plane and between the members, said bushing being connected to each of the members; a reaction member attached to the flywheel and having parts spaced therefrom; a driven plate connected to the shaft and positioned between the flywheel and said parts; a pressure plate connected to the flywheel and positioned between the driven plate and said parts, the pressure plate being movable with respect to the flywheel in a direction longitudinally of the shaft; and resilient means between the parts and the pressure plate to urge the pressure plate toward the flywheel to frictionally engage the driven plate between the flywheel and the pressure plate.

2. A power transmission device to connect a two-mass system, of which one mass is a driving mass and the other mass is a driven mass, the device comprising: a member rotatable about a given axis and connected to the driven mass; a pair of concentric annular members positioned in a plane normal to the given axis; means connecting the inner annular member to the first-named member; means connecting the other annular member to the driving mass; a resilient bushing positioned in the plane and between the annular members, the bushing being connected with each of the annular members; a reaction member carried by the driving mass and having parts spaced from the driving mass; a driven friction element connected to the first-named member between the driving mass and said parts and capable of frictional engagement with the driving mass; a pressure element connected to the driving mass and positioned between the driven friction element and said parts, the pressure element being movable relative to the driving mass in a direction parallel to said axis; and resilient means between said parts and the pressure element to effect said frictional engagement.

3. A device as in claim 2, in which the first-named connecting means is an annular member surrounding said rotatable member and itself rotatable about said axis, the driven friction element being mounted on said first-named connecting means.

4. A power transmission device to connect a two-mass system, of which one mass is a driving mass and the other mass is a driven mass, the device comprising: a shaft rotatable about a given axis and connected to the driven mass; a pair of concentric annular members positioned in a plane normal to and rotatable about said given axis; means connecting the outer annular member to the driving mass; a resilient bushing positioned in the plane and between the annular members, the bushing being connected with each of the annular members; a reaction member carried by the driving mass and having parts spaced from the driving mass; a driven friction element disposed between the driving mass and said parts and capable of frictional engagement with the driving mass; an annular member connecting the inner one of said pair of members and the driven friction element with the shaft; means securing the connecting annular member against longitudinal movement relative to the shaft; a pressure element connected to the driving mass and positioned between the driven friction element and said parts, the pressure element being movable relative to the driving mass in a direction parallel to said axis; and resilient means between said parts and the pressure element to effect said frictional engagement.

References Cited in the file of this patent

UNITED STATES PATENTS

| | | |
|---|---|---|
| 1,804,121 | Simonds | May 5, 1931 |
| 1,925,278 | Paton | Sept. 5, 1933 |
| 1,965,742 | Junkers | July 10, 1934 |
| 1,982,658 | Griswold | Dec. 4, 1934 |
| 1,984,577 | Griswold | Dec. 18, 1934 |
| 2,261,019 | Chilton | Oct. 28, 1941 |
| 2,333,122 | Prescott | Nov. 2, 1943 |

FOREIGN PATENTS

| | | |
|---|---|---|
| 513,914 | Great Britain | Oct. 25, 1939 |